(12) United States Patent
Toutonghi

(10) Patent No.: US 7,430,758 B2
(45) Date of Patent: Sep. 30, 2008

(54) PROMPT AUTHENTICATION

(75) Inventor: Michael J. Toutonghi, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 620 days.

(21) Appl. No.: 10/773,717

(22) Filed: Feb. 5, 2004

(65) Prior Publication Data
US 2005/0177867 A1    Aug. 11, 2005

(51) Int. Cl.
G06F 7/04 (2006.01)
G06F 7/58 (2006.01)
G06F 15/16 (2006.01)
G06F 17/30 (2006.01)
G06K 9/00 (2006.01)
H04L 9/32 (2006.01)
G06F 12/00 (2006.01)
G06F 12/14 (2006.01)
G06F 13/00 (2006.01)
G11C 7/00 (2006.01)
H04K 1/00 (2006.01)

(52) U.S. Cl. .......... 726/5; 726/4; 726/6; 726/12; 726/16; 726/17; 726/18; 726/19; 726/20; 726/22; 726/23; 726/26; 713/182; 713/183; 713/184

(58) Field of Classification Search ............ 726/22, 726/23
See application file for complete search history.

(56) References Cited

U.S. PATENT DOCUMENTS

| 5,721,779 | A | 2/1998 | Funk et al. | |
|---|---|---|---|---|
| 6,018,724 | A | 1/2000 | Arent et al. | |
| 6,950,949 | B1* | 9/2005 | Gilchrist | 726/19 |
| 2002/0196237 | A1* | 12/2002 | Fernando et al. | 345/173 |
| 2006/0005237 | A1* | 1/2006 | Kobata et al. | 726/12 |

FOREIGN PATENT DOCUMENTS

| EP | 0883284 | 12/1998 |
|---|---|---|
| WO | WO-01/18636 | 3/2001 |

* cited by examiner

*Primary Examiner*—Ayaz Sheikh
*Assistant Examiner*—Shin-Hon Chen
(74) *Attorney, Agent, or Firm*—Shook, Hardy & Bacon L.L.P.

(57) ABSTRACT

An authentication graphic included in a password prompt can allow a user to visually authenticate the password prompt. In one embodiment, the present invention includes a client device receiving a password challenge from a server, and displaying a prompt asking the user for a password, the prompt including an authentication graphic visible to the user.

12 Claims, 4 Drawing Sheets

PROMPT AUTHENTICATION

FIELD OF THE INVENTION

The present invention relates to user authentication, and in particular, to prompt authentication.

BACKGROUND

Users of electronic services are usually authenticated with secret passwords. For example, a user can log on to a corporate network using his password. Then, the user can check his Internet e-mail account by verifying his identity with a different password. Similarly, a device, such as a computer or a Personal Digital Assistant (PDA), can prompt the user for a password before allowing access to the device.

When a password is requested, the input area for the password is generally referred to as a prompt. Most prompts include a user identifier (ID) or handle, and a password. Prompts can include various other graphics, such as corporate logos, and various other input fields.

A malicious attacker can simulate the appearance of other entities' prompts by copying them. If a user is presented with such a copycat prompt, the user may not be able to easily recognize the prompt as not authentic. This can lead to the user's password being captured by the attacker.

SUMMARY OF THE INVENTION

An authentication graphic included in a password prompt can allow a user to visually authenticate the password prompt. In one embodiment, the present invention includes a client device receiving a password challenge from a server, and displaying a prompt asking the user for a password, the prompt including an authentication graphic visible to the user.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Figure 1:
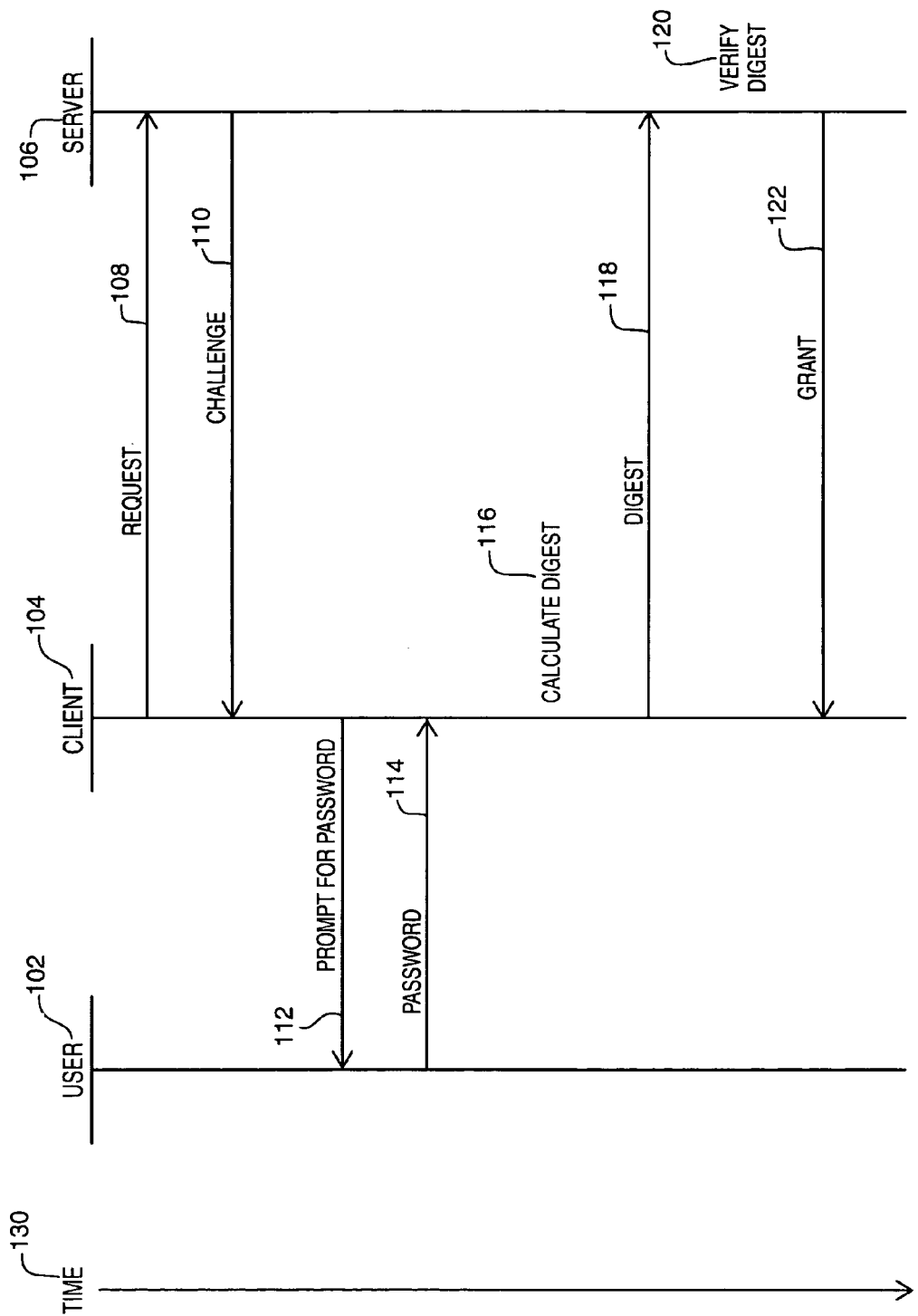
FIG. 1 is a protocol diagram illustrating one embodiment of digest authentication that can be improved using embodiments of the present invention.

Described herein is a prompt having an authentication graphic that can enable a user to visually authenticate the authenticity of a password prompt.

Although the present system will be discussed with reference to various illustrated examples, these embodiments are only examples and do not narrow the scope of the invention. In some portions, tasks are being put forth as performed by either a server or a client computer or device. However these terms are merely to better illustrate the invention using conventional terminology. The present invention is not limited to server-client architecture. Furthermore, various apparatuses are referred to only by name without description, such as device or computer. Such devices or computers are broadly defined to include desktop and laptop computers, various mobile devices such as Personal Digital Assistants (PDA), cellular phones, Blackberries, and other such devices to be developed in the future. Well known computer components, such as, processors, buses, communications devices (e.g., modems), and display devices are not set forth in detail, as they are well known, and only related as context for embodiments of the present invention.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Referring now to FIG. 1, digest authentication is described to provide a context for the various embodiments of the present invention. The present invention is equally applicable to other secure password transmission methods. In FIG. 1, a client 104 (such as a computer, PDA, or any other device that can act as a client) sends a request 108 to a server 106 (such as an e-mail server). This can be in response to an action by the user 102, such as going to the website of the e-mail provider.

In response, the server 106 sends a challenge 110 to the client 104. The challenge can only be "solved" with the user's password, that is, the challenge challenges the user to show possession of the password. The challenge 110 can vary with time, for example by including a timestamp. The challenge can also contain a nonce, which could be implicitly valid only for a specific period of time, after which it will need to be refreshed, or a "realm" or domain for which the user ID and password are considered valid. Various other sources of random information can further be included in the challenge to make a digest outcome even less predictable. Other similar information can be used in a digest process that is duplicated on both the client process and the process controlling the protected resource.

The client 104 then displays a prompt 112 to the user 102 asking for the user's password. The user 102 enters the password 114 which the client 104 receives. In a non-secure non-digest password authentication the password 114 is transmitted as received from the user 102. However, in digest authentication, the client 104 calculates a digest 116 over the password 114 and the challenge 110. This can be done using some hash function, preferably a cryptographically safe one, such as MD-5 or SHA-1. The client 104 then sends the digest 118 to the server 106, which verifies it 120 by recalculating the digest using the stored password for the user and comparing it to the received digest. If the two match, then the user was in possession of the password, and the server 106 grants access 122 to the requested resource, such as the user's e-mail account.

Since the password is never actually transmitted during digest authentication, it is difficult for an attacker to capture it. Capturing the digest will not enable the attacker to recreate the password, especially if the hash used is secure. Making the challenge time-varying also helps by changing the digest each time without changing the password. Other techniques can use more complicated computations than a simple hash, but the password is still not passed directly over the communications medium.

Figure 2:
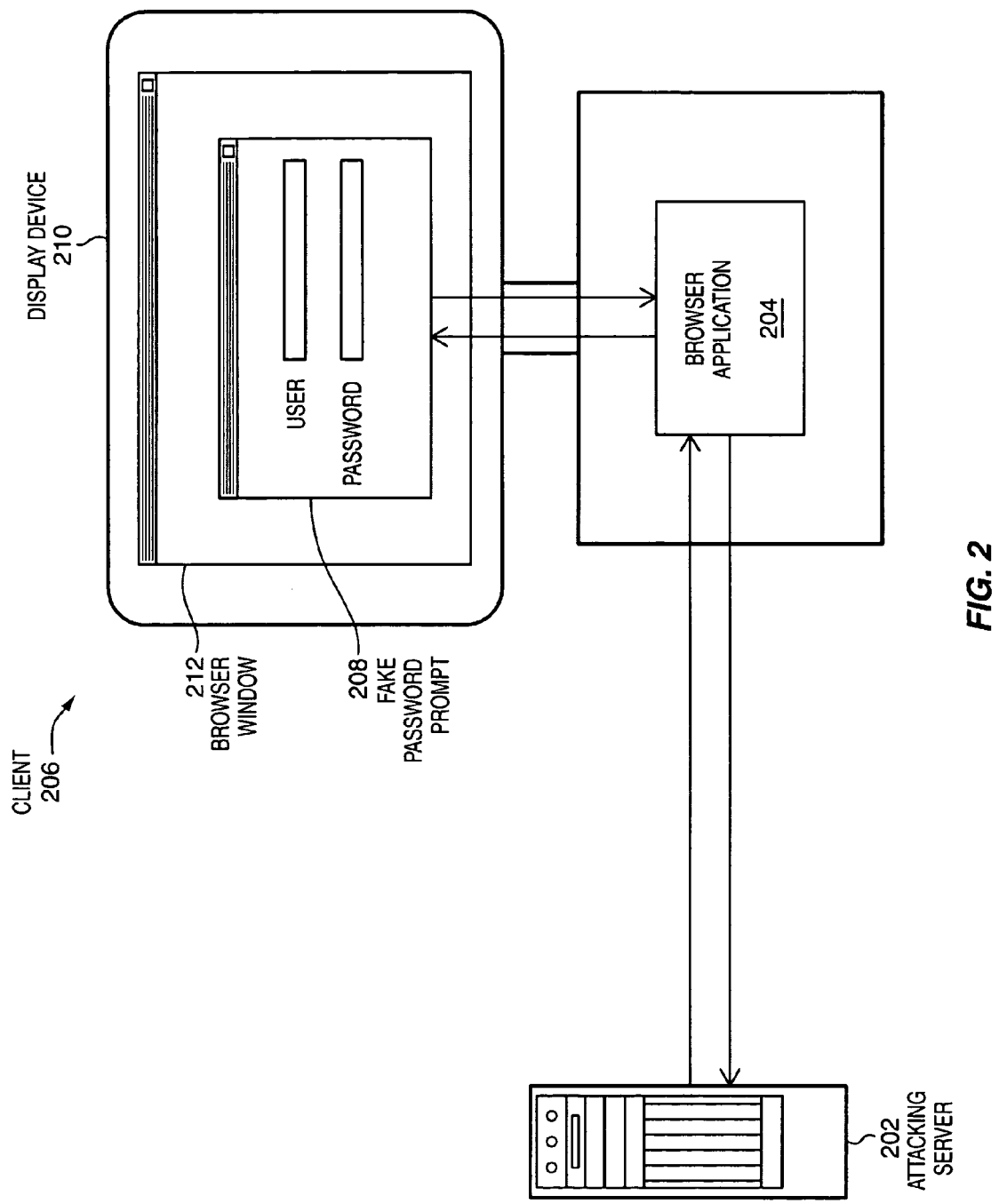
FIG. 2 is a block diagram illustrating one embodiment of a Trojan horse attack that can be prevented using embodiments of the present invention.

FIG. 2 illustrates how an attacker can circumvent the protection of digest authentication to capture the user's password. When the attacking server 202 observes a correct access request or receives a misdirected access request, it can direct a browser application executing on the client 206 to display a password prompt 208 on the client's display device 210 (e.g., monitor, LCD screen). For example, a user mistypes the word "Amazon.com" by one letter in the browser window 212. The attacking server 202 can then instruct the browser application 204 to open a fake password prompt 208 that appears to the user to be the Amazon.com login prompt. The fake prompt 208 can be programmed by the attacker to look identical to an authentic Amazon.com login.

However, the fake prompt 208 is not part of secure authentication, and can be programmed by the attacker to simply deliver the entered username and password to the attacking server 202. Thus, an attacker captures the password. To further throw off the user, the attacking server 202 can also send a "server too busy" message to user so that the user is not suspicious that he was not successfully logged into his Amazon.com account. Such an attack is commonly referred to as a "Trojan horse."

Figure 3:
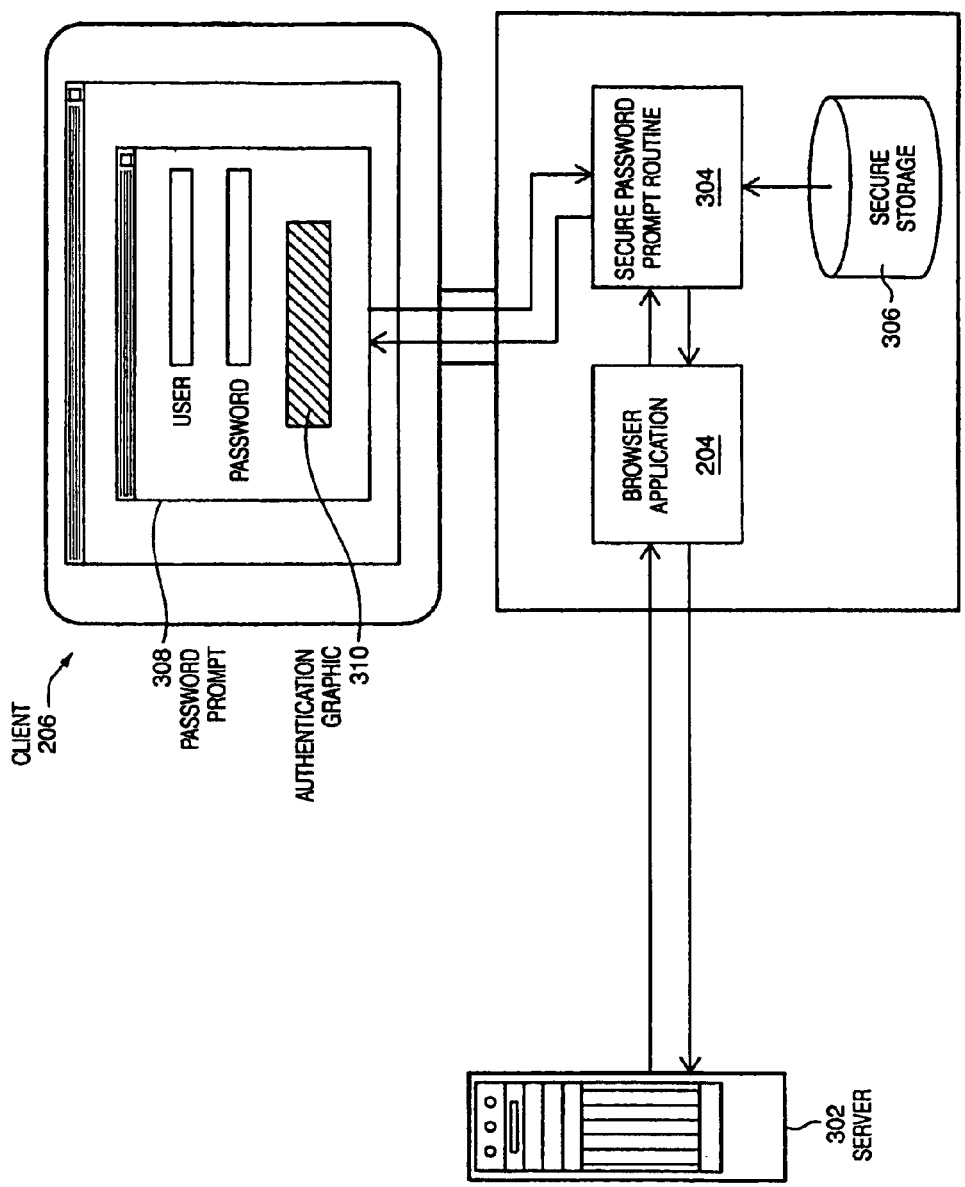
FIG. 3 is a block diagram illustrating one embodiment of password authentication in accordance with one embodiment of the present invention.

One embodiment of the present invention is now described with reference to FIG. 3. In one embodiment, when a server 302 sends a challenge to the browser application 204 of the client 206, the browser application 204 calls a secure password prompt routine 304. The secure password prompt routine can also be a part of the browser application.

The secure password prompt routine has access to a secure storage 306 (if one is available on the client), which stores a secret not known outside of the client 206. The secure password prompt routine then displays the password prompt 308, and generates an authentication graphic 310 from the secret stored in the secure storage 306. This authentication graphic is displayed as part of the password prompt 308. The user can then authenticate the password prompt by looking at the authentication graphic.

When the user enters his password, the secure password routine performs digest calculations before the password is transmitted. Thus, an attacking server can either bypass the secure password prompt routine to display a fake prompt that lacks an authentication graphic, or use the secure password prompt routine and be able to capture only the digest of the password but not the password itself.

In one embodiment, the secret is the authentication graphic itself, and the secure password prompt routine only has to retrieve it. In another embodiment, the authentication graphic is generated based on the secret. For example, the secret can be a string of bits indicating the color/pattern/background (e.g., green/left-to-right stripes/blue) of the authentication graphic. The authentication graphic can be unique to each device, or some repetition amongst devices may be allowed. Even a relatively small number of possible authentication graphics used (e.g., 30-100) can defend against a large percentage of Trojan horse attacks. The secret can be factory seeded or entered manually by the user upon device activation or service subscription.

In one embodiment, to allow the user to visually authenticate the password prompt using the authentication graphic, a copy of the authentication graphic is provided to the user. In one embodiment, this sample authentication graphic can be in a user's manual for the client device. In other embodiments it can be provided as a sticker to be stuck onto the body of the client device, or as a graphic manufactured to be included on the body of the client device.

Figure 4:
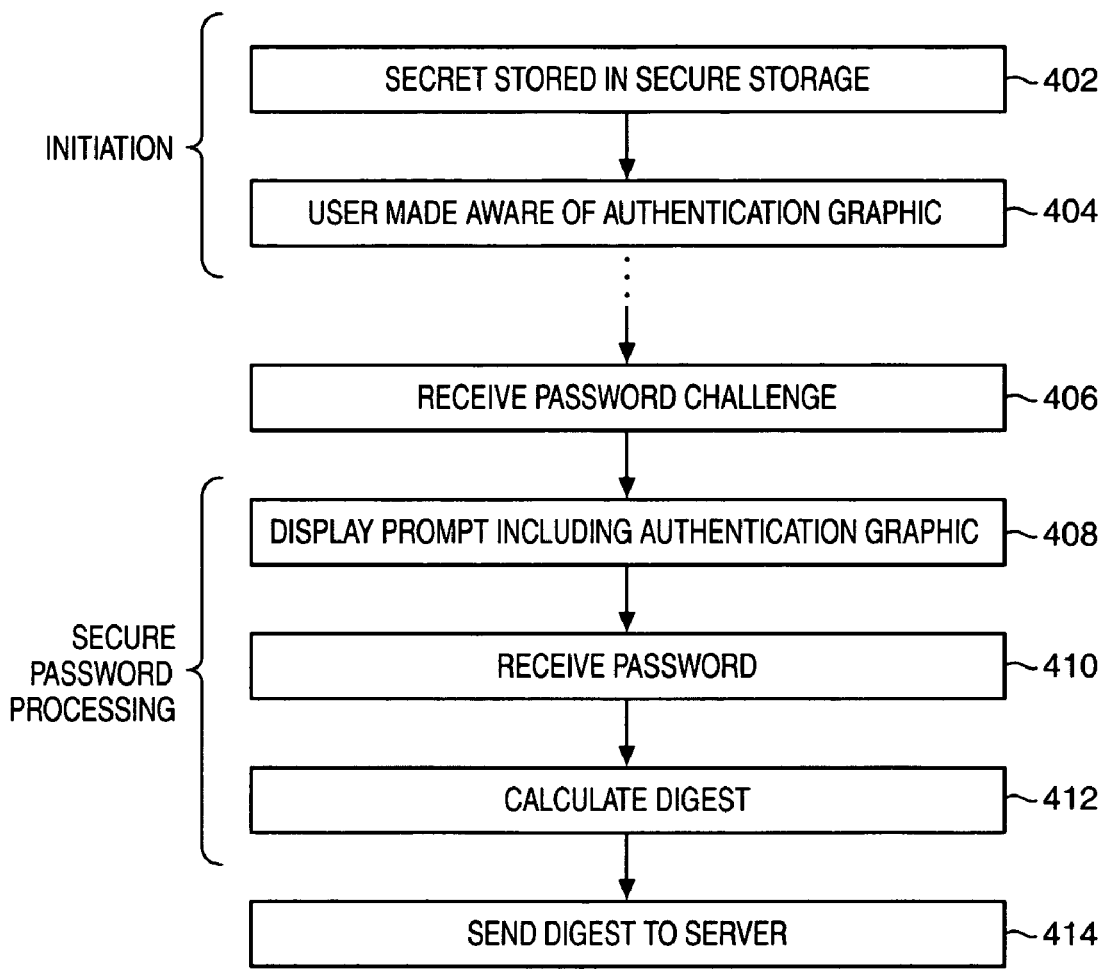
FIG. 4 is a flow diagram illustrating secure password processing in accordance with one embodiment of the present invention.

Some example embodiments are further described with reference to FIG. 4. Blocks 402 and 404 represent the initiation of the client device, which could take place upon manufacture or user activation. In block 402, the secret to be used to generate the authentication graphic (which may be the authentication graphic itself) is stored in secure storage on the client device. The secret can be factory seeded, or it can be manually entered by the user (e.g., as a decimal number, hexadecimal number, character string). In block 404, the user is made aware of what the authentication graphic should look like (e.g., picture in manual, on client device).

Then, in block 406, the client device eventually receives a password challenge from a server wanting to verify the user's identity. In response, secure password processing begins in block 408, when the client displays the secure password prompt that includes the authentication graphic to the user. The client can look up the secret and use it to generate the authentication graphic.

After the user visually authenticates the password prompt by comparing the authentication graphic to his known copy of how the authentication graphic should look, the user enters his password, which the client device thus receives in block 410. In block 412, the client calculates a digest of the password and the challenge, thus completing secure password processing. The client, in block 414, can then send the digest to the server to prove that the user possesses the password.

To illustrate some benefits of present invention, the embodiments above have been described in a digest authentication environment. However, embodiments of the present invention are equally applicable to password prompting that uses different secure or non-secure methods. For example, even where no attempt at password hiding is made, a password prompt authentication graphic according to an embodiment of the present invention can still be used to authenticate the prompt. Such a system will generally not protect against password interception since the passwords are communicated in a non-secure manner, but the prompt authentication graphic will still provide protection against Trojan horse type fake password prompts.

Thus, a secure password prompt, and secure password processing using such a prompt have been described. In the forgoing description, various specific values were given names, such as "secret," and various specific modules, such as the "secure password prompt routine," have been described. However, these names are merely to describe and illustrate various aspects of the present invention, and in no way limit the scope of the present invention. Furthermore, various modules, such as the browser application 204 and the secure password prompt routine in FIG. 3, can be implemented as software or hardware modules, or without dividing their functionalities into modules at all. The present invention is not limited to any modular architecture, whether described above or not.

In the foregoing description, the various examples and embodiments were meant to be illustrative of the present invention and not restrictive in terms of heir scope. Accordingly, the invention should be measured only in terms of the claims, which follow.

The invention claimed is:

1. A method performed by a client comprising:
storing a secret in a secure storage;
receiving a password challenge from a server; and
responsive to the password challenge, calling a secure password prompt routine to execute a procedure, wherein the procedure comprises:
(1) accessing the secret in the secure storage;
(2) generating an authentication graphic based on the secret; and
(3) rendering a prompt at a display device, the prompt including a request for a user to input a password and the authentication graphic, which are visible to the user; wherein the secure password prompt routine renders the authentication graphic for all password challenges;
receiving the password from the user;
generating a digest with a cryptographically-safe function that includes indicia of the received password and the received password challenge, wherein the digest is a communication that securely protects the password from being intercepted; and
sending the digest to the server, wherein the server verifies the digest by comparing it to a recalculated digest that includes an indicia of the password challenge and a stored authentic password.

2. The method of claim 1, further comprising making the authentication graphic known to the user so that the user can identify the authentication graphic on the prompt prior to the user inputting a password in response to the prompt.

3. The method of claim 2, wherein making the authentication graphic known comprises physically attaching the authentication graphic to the client.

4. The method of claim 1, wherein the secret becomes stored in the secure storage when first entered by the user.

5. The method of claim 1, wherein the secret becomes stored in the secure storage when generated based upon information entered by the user.

6. The method of claim 1, wherein making the authentication graphic known comprises including the authentication graphic in a user manual for the client.

7. The method of claim 1, wherein the authentication is unique to the client.

8. A client device comprising:
a secure storage to store a secret;
a communications device to receive a password challenge from a server; and
a secure password prompt routine embodied in the communications device to, in response to the password challenge, execute a procedure, wherein the procedure comprises:
(1) accessing the secret in the secure storage, wherein the secret is a string of bits indicating colors and patterns for constructing the authentication graphic;
(2) generating an authentication graphic based on the secret; and
(3) rendering a prompt at a display device, the prompt including a request for a user to input a password and the authentication graphic, which are visible to the user, wherein the secure password prompt routine renders the authentication graphic for all password challenges;
a display device to present the rendered prompt to the user such that the authentication graphic of the presented prompt is recognized by the user as being associated with a secure request to input the password; and
a hash function embodied on the communications device to calculate a digest, wherein calculating comprises:
(1) receiving a password in response to the received password challenge, wherein the password is received upon the user identifying the authentication graphic as authentic;
(2) altering the password such that, if the digest is captured by an attacker, the attacker is unable to recreate the password; and
(3) calculating the digest from the password challenge and the altered password.

9. The client device of claim 8 wherein the authentication graphic is included on a body of the client device.

10. A machine-readable medium having stored thereon data representing instructions that, when executed by a processor of a client, cause the processor to perform operations comprising:
receiving a password challenge from a server;
responsive to the password challenge calling, a secure password prompt routine to execute a procedure, wherein the procedure comprises:
(1) accessing the secret in the secure storage;
(2) generating an authentication graphic based on the secret; and
(3) rendering a prompt at a display device, the prompt including a request for a user to input a password and the authentication graphic, which are visible to the user; wherein the secure password prompt routine renders the authentication graphic for all password challenges;
receiving the password from the user;
altering the received password utilizing a hash function;
generating a digest using the altered password and the received password challenge; and sending the digest to the server without directly passing the password over a communications medium.

11. The method of claim 10, further comprising making the authentication graphic known to the user so that the user can identify the authentication graphic on the prompt prior to the user inputting a password in response to the prompt.

12. The method of claim 10, wherein making the authentication graphic known comprises physically attaching the authentication graphic to the client.

* * * * *